United States Patent
Chiu et al.

(10) Patent No.: US 10,804,734 B2
(45) Date of Patent: Oct. 13, 2020

(54) REDUNDANT POWER SUPPLY SYSTEM THAT PROLONGS THE HOLDUP TIME AFTER A POWER FAILURE

(71) Applicant: ACBEL POLYTECH INC., New Taipei (TW)

(72) Inventors: Jui-Yang Chiu, New Taipei (TW); Cheng-Yen Yeh, New Taipei (TW); Chien-Ting Cho, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 428 days.

(21) Appl. No.: 15/725,534

(22) Filed: Oct. 5, 2017

(65) Prior Publication Data
US 2019/0109486 A1   Apr. 11, 2019

(51) Int. Cl.
*H02J 9/06* (2006.01)
(52) U.S. Cl.
CPC .................... *H02J 9/061* (2013.01)
(58) Field of Classification Search
CPC .............................................. H02J 9/061
See application file for complete search history.

(56) References Cited

U.S. PATENT DOCUMENTS

| | | | | |
|---|---|---|---|---|
| 7,898,111 B1* | 3/2011 | Pistel | ...................... | H02J 1/102 307/82 |
| 8,310,100 B2* | 11/2012 | Humphrey | .............. | H02M 1/32 307/80 |
| 2002/0071300 A1* | 6/2002 | Jang | ........................ | H02J 7/345 363/125 |
| 2006/0039172 A1* | 2/2006 | Soldano | .............. | H02M 1/4208 363/59 |
| 2010/0014330 A1* | 1/2010 | Chang | ................. | H02M 1/4225 363/89 |
| 2014/0111895 A1* | 4/2014 | Peng | .................... | H02H 11/002 361/57 |

* cited by examiner

*Primary Examiner* — Jared Fureman
*Assistant Examiner* — Emmanuel Dominique
(74) *Attorney, Agent, or Firm* — Sinorica, LLC

(57) ABSTRACT

A redundant power supply system has power supplies and holdup control circuits. The power supplies are connected in parallel for connecting to an input capacitor of a load system. An OR-gate anti-reverse current element is connected between each of the power supplies and the input capacitor. The holdup control circuits correspondingly connect to the DC output sides of the power supplies. Each of the holdup control circuits has an inductor, an electronic switch and a controller. The inductor is connected in series to the OR-gate anti-reverse current element. The electronic switch is connected between the DC output side of the corresponding power supply and a node where the inductor and the OR-gate anti-reverse current element are connected. The controller turns on and off of the electronic switch according to the DC power output from the DC output sides, thereby prolonging the holdup time after a power failure.

20 Claims, 7 Drawing Sheets

REDUNDANT POWER SUPPLY SYSTEM THAT PROLONGS THE HOLDUP TIME AFTER A POWER FAILURE

BACKGROUND OF THE INVENTION

1. Field of the Invention

The invention relates to a redundant power supply system and, in particular, to a redundant power supply system that prolongs the holdup time after a power failure.

2. Description of Related Art

FIG. 7 shows the circuit structure of a typical redundant power supply system. The redundant power supply system includes several power supplies 30. As is well known, each of the power supplies 30 mainly includes an AC/DC power converter, a power factor correction (PFC) circuit, and a DC/DC power converter. The AC/DC power converter has an AC input side for receiving the AC current from the commercial power. The DC/DC power converter has a DC output side that is provided with an output capacitor $C_1$.

Through the cooperation of the AC/DC power converter, the PFC circuit, and the DC/DC power converter, the AC power is converted into a DC power and the power factor is corrected, thereby outputting a DC power Vo on the DC output side. The DC output sides of the power supplies 30 are connected in parallel and to the input side of a load system 40. An OR-gate anti-backflow diode 50 is connected between the DC output sides of the power supplies 30 and the load system 40. The anode of the OR-gate anti-backflow diode 50 connects to the DC output sides of the power supplies 30 while the cathode thereof connects to the load system 40.

The typical redundant power supply system uses the power supplies 30 to output the DC power Vo together. The DC power Vo is then supplied to the input side of the load system 40 via the forward-biased OR-gate anti-backflow diode 50. At the same time, the input capacitor $C_2$ on the input side of the load system 40 is charged. Suppose that the AC input sides of the power supplies can normally receive an AC current. When any of the power supplies 30 is out of order and cannot output the DC power Vo, the other power supplies 30 can continue to supply power to the load system 40, achieving the goal of continuous power supply. Using the OR-gate anti-backflow diode 50, a failed power supply 30 is isolated from other functioning power supplies 30. This prevents the malfunctioning current from flowing into the DC output sides of all the power supplies 30.

Alternatively, the OR-gate anti-backflow diode 50 can be replaced by an OR-gate anti-backflow MOS (not shown). The drain and source of the OR-gate anti-backflow MOS connect respectively to the DC output sides of the power supplies 30 and the load system 40. A body diode is provided between the drain and the source. A controller electrically connects the control, drain and source of the OR-gate anti-backflow MOS. When the controller determines that the body diode has a forward bias (i.e., the source voltage is larger than the drain voltage), the controller controls the OR-gate anti-backflow MOS to be open. This then isolates the disordered power supply 30 from the other normal power supplies 30, preventing the malfunctioning current from entering the DC output side of each of the power supplies 30.

When the typical redundant power supply system suddenly stops outputting DC power, such as sudden power off or AC power failure, the load system 40 executes an emergency procedure (e.g., data backup, power off, etc.) because no DC power Vo is received. In this case, the input capacitor $C_2$ on the input side of the load system 40 discharges. As it continues releasing energy, the voltage of the input capacitor $C_2$ gradually drops. When detecting that the voltage of the input capacitor $C_2$ is lower than a threshold voltage, the load system 40 directly shuts off. The time since the load system 40 stops receiving the DC power Vo until the voltage of the input capacitor $C_2$ becomes lower than the threshold voltage is called a holdup time. Apparently, at the moment of power off, the load system 40 may turn off abnormally and have bad effects (e.g., data loss) if the emergency procedure is not completed yet.

A typical improvement method is to use input capacitors $C_1$ with larger capacitance for the power supplies 30, so that the input capacitor $C_2$ of the load system 40 can withdraw the energy from the input capacitors $C_1$. This prolongs the discharge of the input capacitor $C_2$ to make the holdup time longer. However, not only does it cost higher to use large-capacitance capacitors $C_1$ for each of the power supplies 30, but also the volume thereof is bigger and results in inconvenience for the design of the typical redundant power supply system. Besides, it is not cost effective to use large-capacitance capacitors $C_1$ just for the purpose of temporarily prolonging the holdup time.

SUMMARY OF THE INVENTION

In view of the foregoing, an objective of the invention is to provide a redundant power supply system that prolongs the holdup time after a power failure. Based upon the circuit structure of a redundant power supply system and without using capacitors with larger capacitance, the invention can elongate the holdup time.

The redundant power supply system that prolongs the holdup time after a power failure is for connecting to an input capacitor of a load system. The redundant power supply system includes:

a plurality of power supplies connected in parallel for connecting to the input capacitor, wherein at least one OR-gate anti-reverse current element is connected between a DC output side of each of the power supplies and the input capacitor, and an output capacitor is provided on the DC output sides of the power supplies; and a plurality of holdup control circuits, each of the holdup control circuits correspondingly connected between one of the DC output sides of the power supplies and the load system, each of the holdup control circuits comprising at least one inductor connected in series to the at least one OR-gate anti-reverse current element;

at least one electronic switch connected between the DC output side of each of the power supplies and a node where the inductor and the OR-gate anti-reverse current element are connected; and a controller connected to the DC output side of each of the power supplies and a control terminal of the at least one electronic switch, thereby determining whether a DC power output from the DC output side goes below a threshold and controlling the electronic switch to turn on and off.

According to the invention, when the power supplies function normally, the controller can detect DC power output from each set of power supply and holdup control circuit. The controller then controls the electronic switch to be open. In this case, the DC power output from the power supplies can be transmitted to the load system.

When the power supplies suddenly stop functioning, the controller detects no DC power output. The controller then controls the electronic switch to be intermittently conductive. In this case, the output capacitor and inductor of each of the power supplies discharge to the input capacitor of the load system, so that the voltage of the input capacitor maintains for a period of time before dropping or drops at a slower rate. Therefore, the holdup time is extended. For example, the holdup time of the invention can be more than 1.5 times that provided by a typical redundant power supply system. As a benefit, the load system has more time to complete the emergency procedure in response to the power failure.

On the other hand, in comparison with large-capacitance capacitors, the holdup control circuit includes only electronic elements such as controllers, inductors, diodes or transistors. Therefore, the holdup control circuit has lower cost and smaller volume, without causing inconvenience in the design of the system. This overcomes problems in the prior art derived from using large-capacitance capacitors.

DETAILED DESCRIPTION OF THE PREFERRED EMBODIMENT

Figure 1:
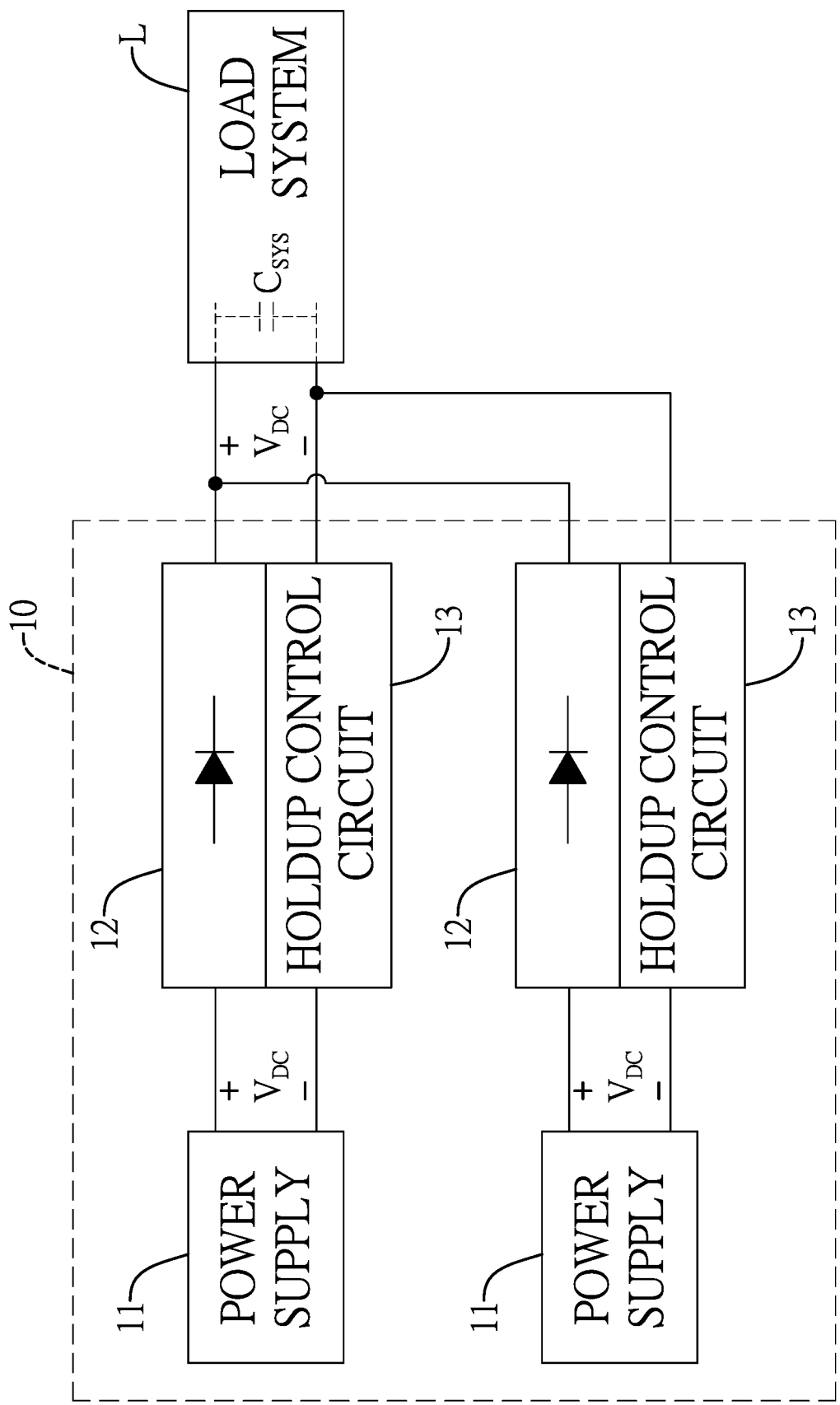
FIG. 1 is a block diagram of the circuit used in the redundant power supply system that can elongate the holdup time after a power failure.

With reference to FIG. 1, a redundant power supply system 10 that prolongs the holdup time after a power failure is configured to connect to an input capacitor $C_{SYS}$ of a load system L. The redundant power supply system 10 outputs DC power $V_{DC}$ to the load system L. When the load system L detects that the voltage across the input capacitor $C_{SYS}$ is lower than a threshold voltage, the load system L directly shuts off. A time period, from the time when the load system L stops receiving the DC power $V_{DC}$ to the time when the voltage across the input capacitor $C_{SYS}$ is lower than the threshold voltage, is called a holdup time.

The redundant power supply system 10 includes several power supplies 11, at least one OR-gate anti-reverse current element 12 correspondingly connected to each of the power supplies 11, and several holdup control circuits 13. The embodiment shown in FIG. 1 uses two power supplies 11 for illustration purposes. The invention, however, is not limited to this particular example. Alternatively, the invention can also be comprised only of one power supply 11, one OR-gate anti-reverse current element 12, and one holdup control circuit 13.

As shown in FIG. 1, the power supplies 11 are connected in parallel for the connection of the input capacitor $C_{SYS}$ of the lower system L, forming a many-to-one connection structure (i.e., multiple power supplies 11 to one load system L). Each of the power supplies 11 has a DC output side that connects to the load system L via the corresponding OR-gate anti-reverse current element 12. For example, each of the power supplies 11 mainly includes an AC/DC power converter, a PFC circuit, and a DC/DC power converter. The AC/DC power converter has an AC input side for receiving AC power from the commercial power. The DC/DC power converter has the DC output side of the power supply 11 for outputting DC power $V_{DC}$ being converted. The DC power $V_{DC}$ output from each of the power supplies 11 goes through the OR-gate anti-reverse current element 12 and is imposed on the load system L. The holdup control circuits 13 correspond respectively to the DC output sides of the power supplies 11, forming a one-to-one connection structure (i.e., one power supply 11 corresponds to a distinctive holdup control circuit 13).

The holdup control circuits 13 are connected respectively between the DC output sides of the power supplies 11 and the load system L. As shown in embodiments of FIGS. 2 to 6, only one power supply 11 and a corresponding holdup control circuit 13 are shown for the illustration. The DC output side of each of the power supplies 11 has a power terminal 111 and a ground terminal 112 between which is provided with an output capacitor $C_{DC}$. Each of the holdup control circuits 13 includes at least one inductor 131, at least one electronic switch 132, and a controller 133.

Figure 2:
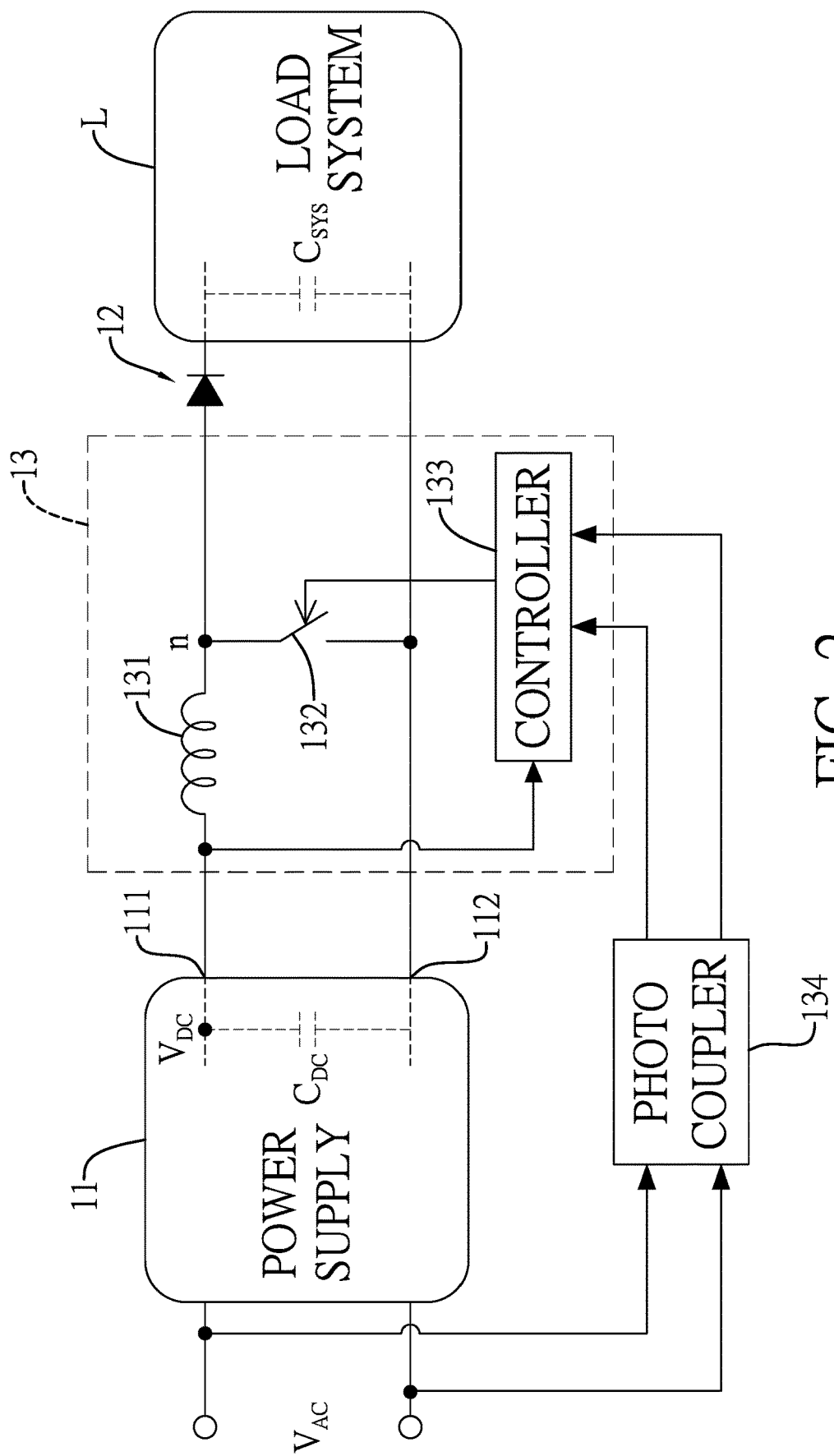
FIG. 2 is a block diagram of the circuit of a power supply connected to a first embodiment of a holdup control circuit.

In a first embodiment shown in FIG. 2, each of the holdup control circuits 13 includes one inductor 131, one electronic switch 132, and one controller 133. The DC output side of each of the power supplies 11 is connected to an OR-gate anti-reverse current element 12. The inductor 131 is connected in series to the OR-gate anti-reverse current element 12, with one terminal of the inductor 131 connecting to the power terminal 111. The OR-gate anti-reverse current element 12 connects to the input capacitor $C_{SYS}$ of the load system L. The electronic switch 132 is connected between a ground terminal 112 and a node n between the inductor 131 and the OR-gate anti-reverse current element 12. The electronic switch 132 can be a transistor having a first terminal, a second terminal, and a control terminal. For example, the first terminal can be the drain, the second terminal can be the source, and the control terminal can be the grate. The first terminal connects to the node n, and the second terminal connects to the ground terminal 112. The OR-gate anti-reverse current element 12 can be an anti-backflow diode, with the anode thereof connecting to the other terminal of the inductor 131 and the cathode thereof connecting to the input capacitor $C_{SYS}$ of the load system L. The controller 133 connects to the power supply 11 and the control terminal of the electronic switch 132 and controls the on and off of the electronic switch 132 based upon whether the DC output side outputs the DC power $V_{DC}$.

As an example, as shown in FIG. 2, the controller 133 connects to the power terminal 111 to detect the magnitude of the DC power $V_{DC}$. When the controller 133 determines that the DC power $V_{DC}$ is greater than or equal to a threshold, it is considered that there is the output of DC power $V_{DC}$. On the other hand, when the controller 133 determines that the DC power $V_{DC}$ is lower than the threshold, it is considered to have no output of DC power $V_{DC}$. Alternatively, the controller 133 can further connect to the AC input side of the power supply 11 via a photo coupler 134 to directly detect whether the AC power $V_{AC}$ is received. If no AC power $V_{AC}$ is received, there will apparently be no output of DC power $V_{DC}$.

The following uses one example to explain how the circuit in the first embodiment functions. With reference to FIGS. 1 and 2, when all the power supplies 11 operate normally, the power supplies 11 concurrently output DC power $V_{DC}$ to the load system L. In each set of the power supply 11 and the holdup control circuit 13, the controller 133 controls the electronic switch 132 to be open when an output of the DC power $V_{DC}$ is detected. In this case, the DC power $V_{DC}$ passes through the inductor 131 and the OR-gate anti-reverse current element 12 and reaches the load system L. The output capacitor $C_{DC}$ of each of the power supplies 11 and the input capacitor $C_{SYS}$ of the load system L store energy according to the DC power $V_{DC}$. The inductor 131 filters out switching ripples and high-frequency noises of the DC power $V_{DC}$.

When all of the power supplies 11 suddenly stop functioning, such as a sudden shutdown or temporary power failure of the AC power $V_{AC}$, all of the power supplies 11 cannot output the DC power $V_{DC}$. The output capacitor $C_{DC}$ releases its stored energy and reduces its terminal voltage. In each set of the power supply 11 and the holdup control circuit 13, the controller 133 controls the electronic switch 132 to be intermittently conductive when the DC power $V_{DC}$ is detected to be lower than the threshold. For example, the controller 133 can output a pulse width modulation (PWM) signal to the control terminal of the electronic switch 132. With reference to FIG. 2, the output capacitor $C_{DC}$ of each of the power supplies 11, the inductor 131, the OR-gate anti-reverse current element 12, the electronic switch 132, and the controller 133 form a boost converter. The operation of the boost converter is well-known and not further described herein.

Therefore, in comparison with a redundant power supply system without a boost converter, the invention uses the output capacitor $C_{DC}$ to release the stored energy via the boost converter to the input capacitor $C_{SYS}$ of the load system L when all the power supplies 11 stop outputting the DC power $V_{DC}$. The input capacitor $C_{SYS}$ receives the boosted voltage. As a result, the terminal voltage of the input capacitor $C_{SYS}$ remains for some time before it reduces or reduces at a slower rate. This effectively prolongs the holdup time, so that the load system L has more holdup time to complete the emergency procedure after a power failure.

Figure 3:
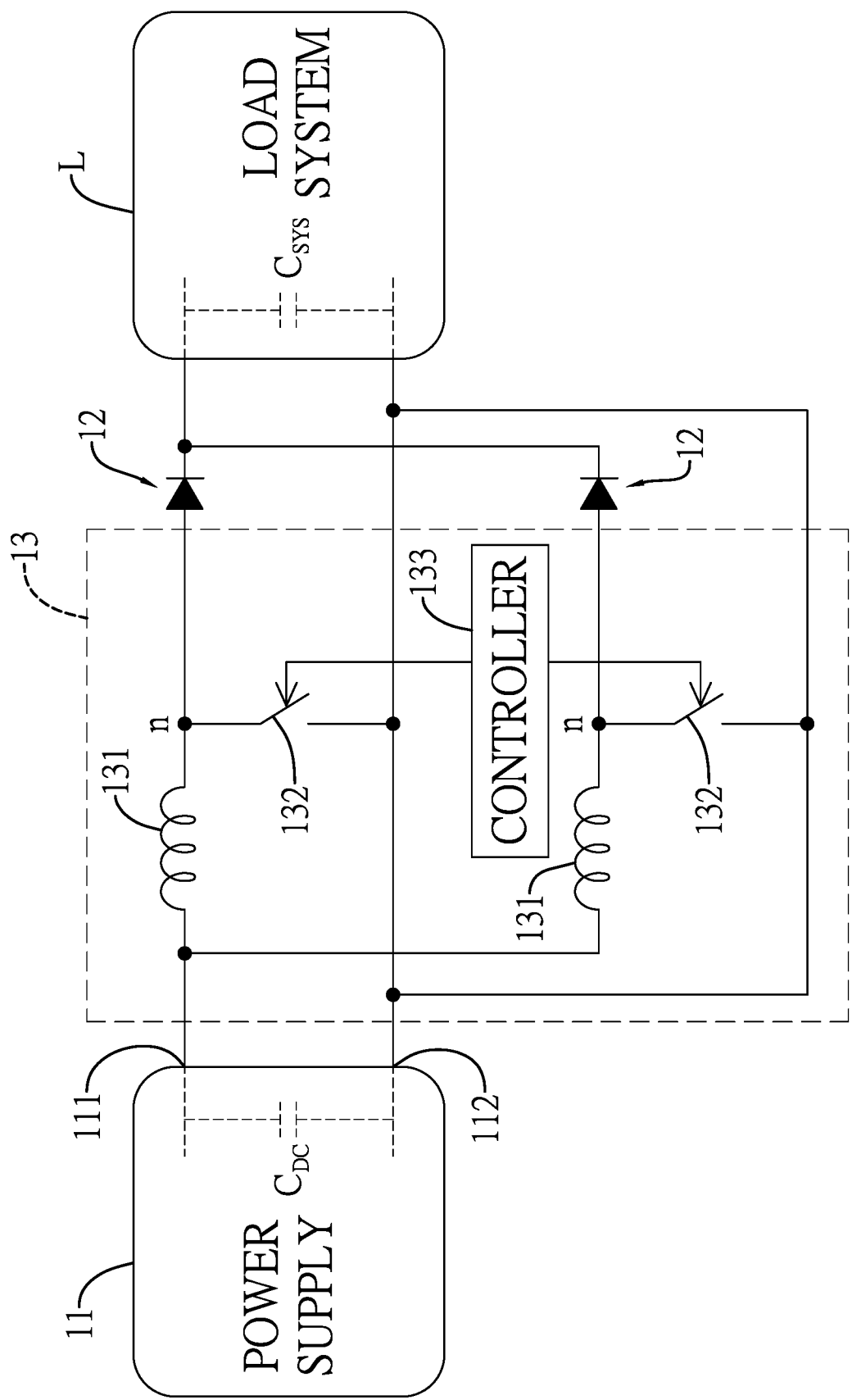
FIG. 3 is a block diagram of the circuit of a power supply connected to a second embodiment of a holdup control circuit.

With reference to a second embodiment shown in FIG. 3, in each set of the power supply 11 and the holdup control circuit 13, each of the power supplies 11 connects to the load system L via a plurality of OR-gate anti-reverse current elements 12. The holdup control circuit 13 includes inductors 131, electronic switches 132, and a controller 133. The inductors 131 are connected in series to the OR-gate anti-reverse current elements 12. The electronic switches 132 connect respectively to the nodes n between the inductors 131 and the OR-gate anti-reverse current elements 12 and the DC output side of each of the power supplies 11. More explicitly, one terminal of each of the inductors 131 connects to the power terminal 111. Each of the OR-gate anti-reverse current elements 12 connects to the input capacitor $C_{SYS}$ of the load system L. Each of the electronic switches 132 connects between the node n between each of the inductors 131 and each of the OR-gate anti-reverse current elements 12 and the ground terminal 112. The controller 133 connects to the control terminals of the electronic switches 132. Therefore, the output capacitor $C_{DC}$ of each of the power supplies 11, the inductor 131, the OR-gate anti-reverse current elements 12, the inductors 131, the electronic switches 132, and the controller 133 form multiple boost converters after the AC power fails.

It should be noted that in the second embodiment shown in FIG. 3, the controller 133 can use the phase retardation method to uniformly distribute the conductive phase difference of the electronic switches 132 when boosting the voltage. For example, suppose there are m electronic switches 132. The phase difference between two consecutive electronic switches 132 is 360°/m. With this, the current released from the output capacitor $C_{DC}$ is evenly distributed among the boost circuits, achieving the effect of current sharing. Hence, the current in the inductor 131 and the OR-gate anti-reverse current element 12 in each boost circuit is smaller. The design of the inductor 131 is thus simpler.

Figure 4:
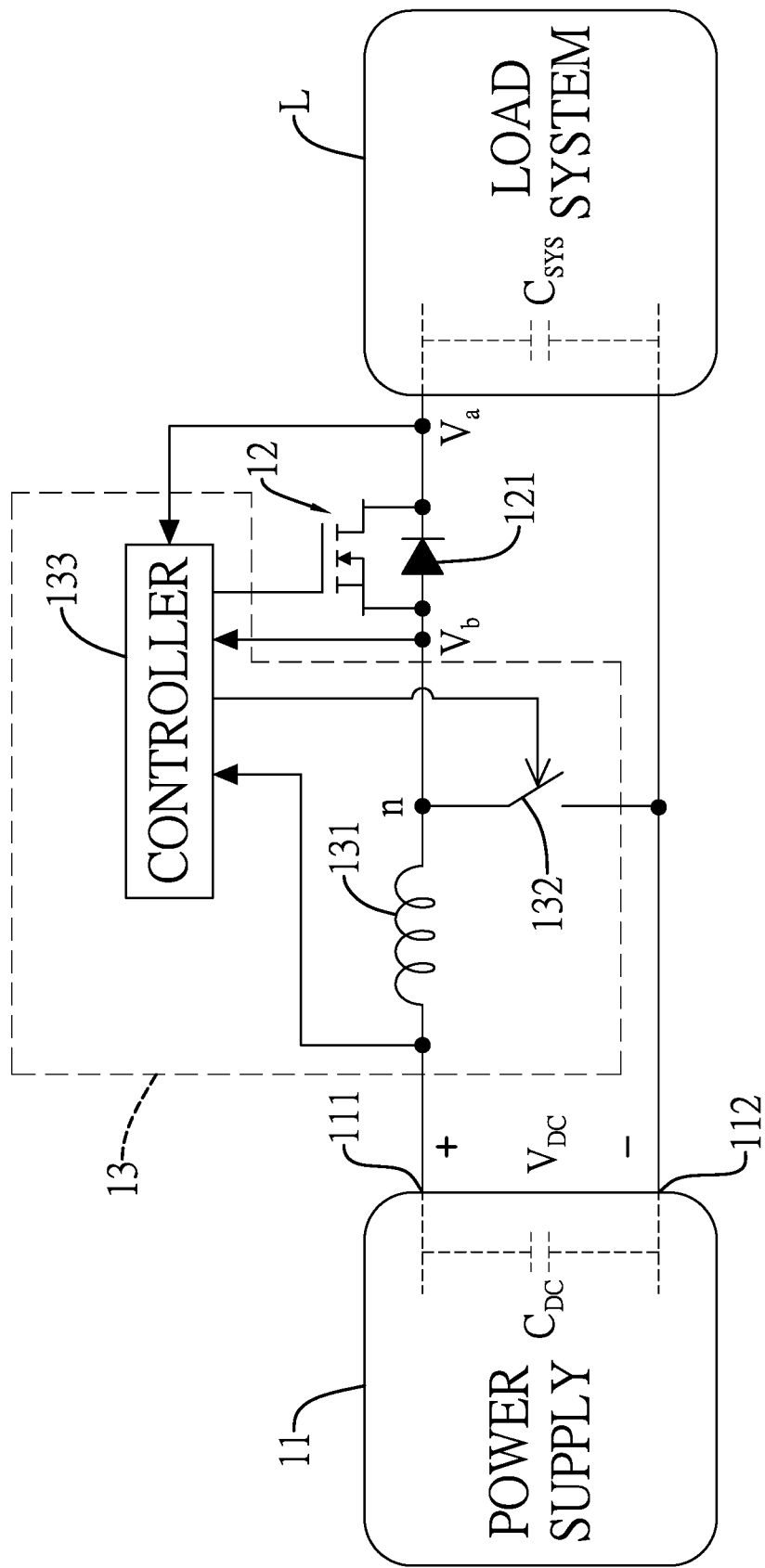
FIG. 4 is a block diagram of the circuit of a power supply connected to a third embodiment of a holdup control circuit.

The OR-gate anti-reverse current element 12 in the first and second embodiments is an OR-gate anti-backflow diode as an example. Another embodiment of the OR-gate anti-reverse current element 12 is an OR-gate anti-backflow MOS. With reference to FIG. 4, the OR-gate anti-reverse current element 12 has a first terminal, a second terminal, and a control terminal. The first terminal and the second terminal can be respectively the drain and the source, and the control terminal is the gate. The control terminal connects to an output terminal of the controller 133. The first terminal and the second terminal of the OR-gate anti-reverse current element 12 connect respectively to the two input terminals of the controller 133 for the controller 133 to detect the first terminal voltage Va and the second terminal voltage Vb. A body diode 121 is connected between the first terminal and the second terminal, with the anode of the body diode 121 connected to the DC output sides of the power supplies 11 and the cathode of the body diode 121 connected to the load system L. More explicitly, as shown in FIG. 4, the anode of the body diode 121 connects to the inductor 131 and the cathode thereof connects to the input capacitor $C_{SYS}$ of the load system L.

With reference to FIG. 4, when detecting an output of the DC power $V_{DC}$, the controller 133 controls the electronic switch 132 to be open and the OR-gate anti-reverse current element 12 to be conductive, so that the DC power $V_{DC}$ is delivered to the load system L. On the other hand, when detecting no output of the DC power $V_{DC}$, the controller 133 simultaneously controls the electronic switch 132 and the OR-gate anti-reverse current element 12 to be intermittently conductive. As a result, the output capacitor $C_{DC}$ of the power supply 11, the inductor 131, the body diode 121, the electronic switch 132, and the controller 133 form a boost converter. When the controller 133 determines that the body diode 121 has a reverse bias (i.e., Va>Vb), it means the possibility of a disordered current flowing through. The controller 133 immediately controls the OR-gate anti-reverse current element 12 to be open, thereby isolating and preventing the power supply 11 from receiving the disordered current on the DC input side thereof. In comparison with the technology of the OR-gate anti-reverse current element and the controller in the prior art, this embodiment merely adds the inductor 131 and the electronic switch 132. Thus, the hardware cost of the embodiment is low.

Figure 5:
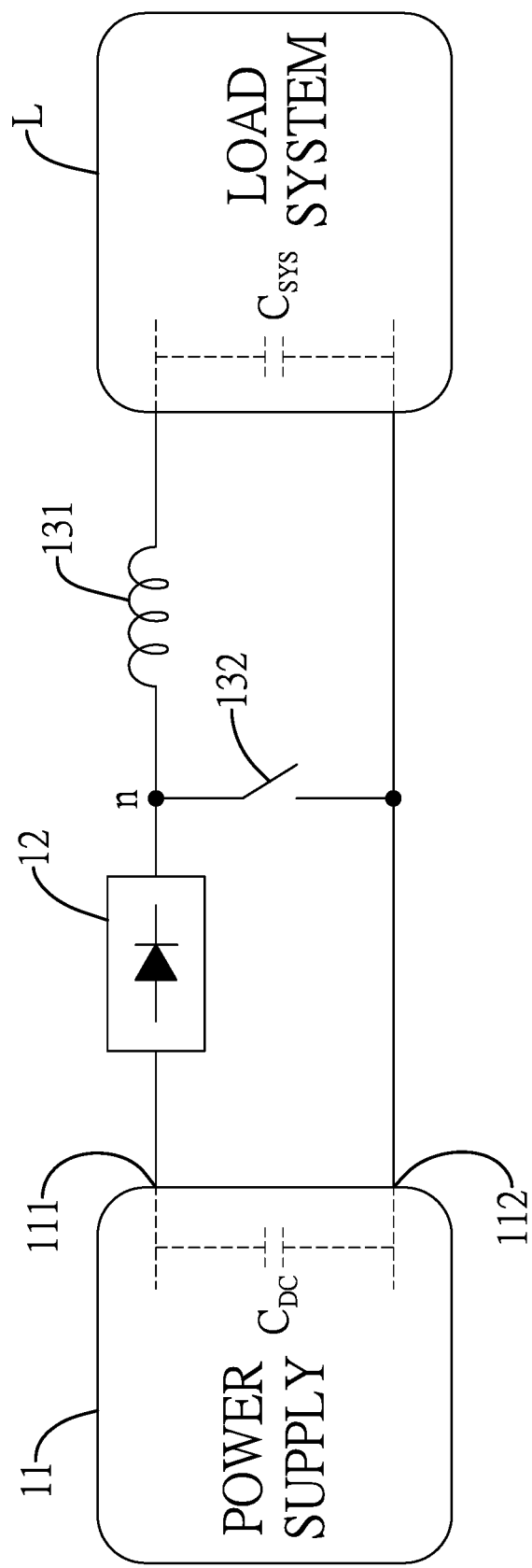
FIG. 5 is a block diagram of the circuit of a power supply connected to a fourth embodiment of a holdup control circuit.

With reference to FIG. 5 for another embodiment, in each holdup control circuit, one terminal of the inductor 131 connects to the input capacitor $C_{SYS}$. The OR-gate anti-reverse current element 12 connects to the power terminal 111 of the power supply 11. The electronic switch 132 connects between the node n between the inductor 131 and the OR-gate anti-reverse current element 12 and the ground terminal 112 of the power supply 11. For example, the OR-gate anti-reverse current element 12 may be a diode or the body diode of a transistor, with the anode thereof connecting to the power terminal 111 and the cathode thereof connecting to the inductor 132. The electronic switch 132 can be a diode or the body diode of a transistor, with the anode and cathode thereof connecting respectively to the node n and the ground terminal 112. Therefore, the output capacitor $C_{DC}$, the OR-gate anti-reverse current element 12, the inductor 131, the electronic switch 132 and the controller (not shown) form a buck converter when an AC power failure occurs. The operation of the buck converter is well known and not repeated herein.

Figure 6:
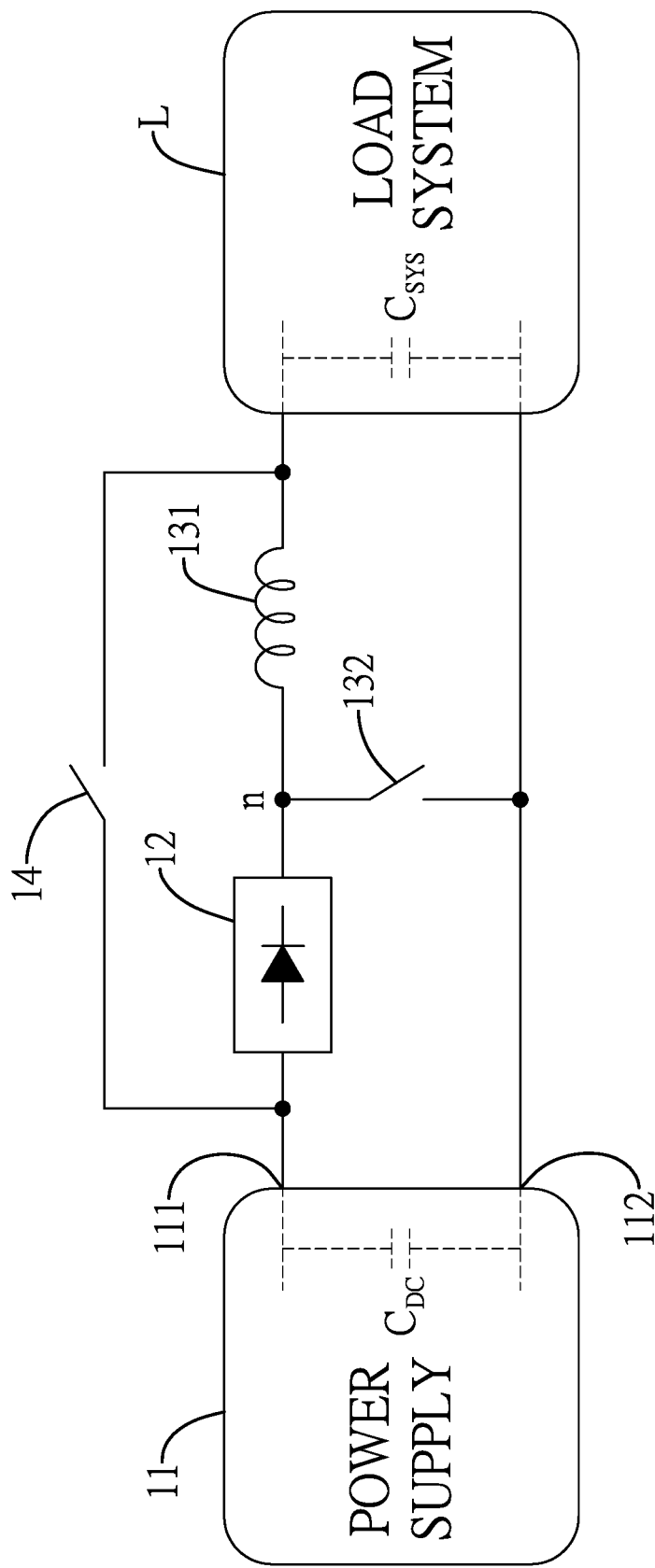
FIG. 6 is a block diagram of the circuit of a power supply connected to a fifth embodiment of a holdup control circuit.
Figure 7:
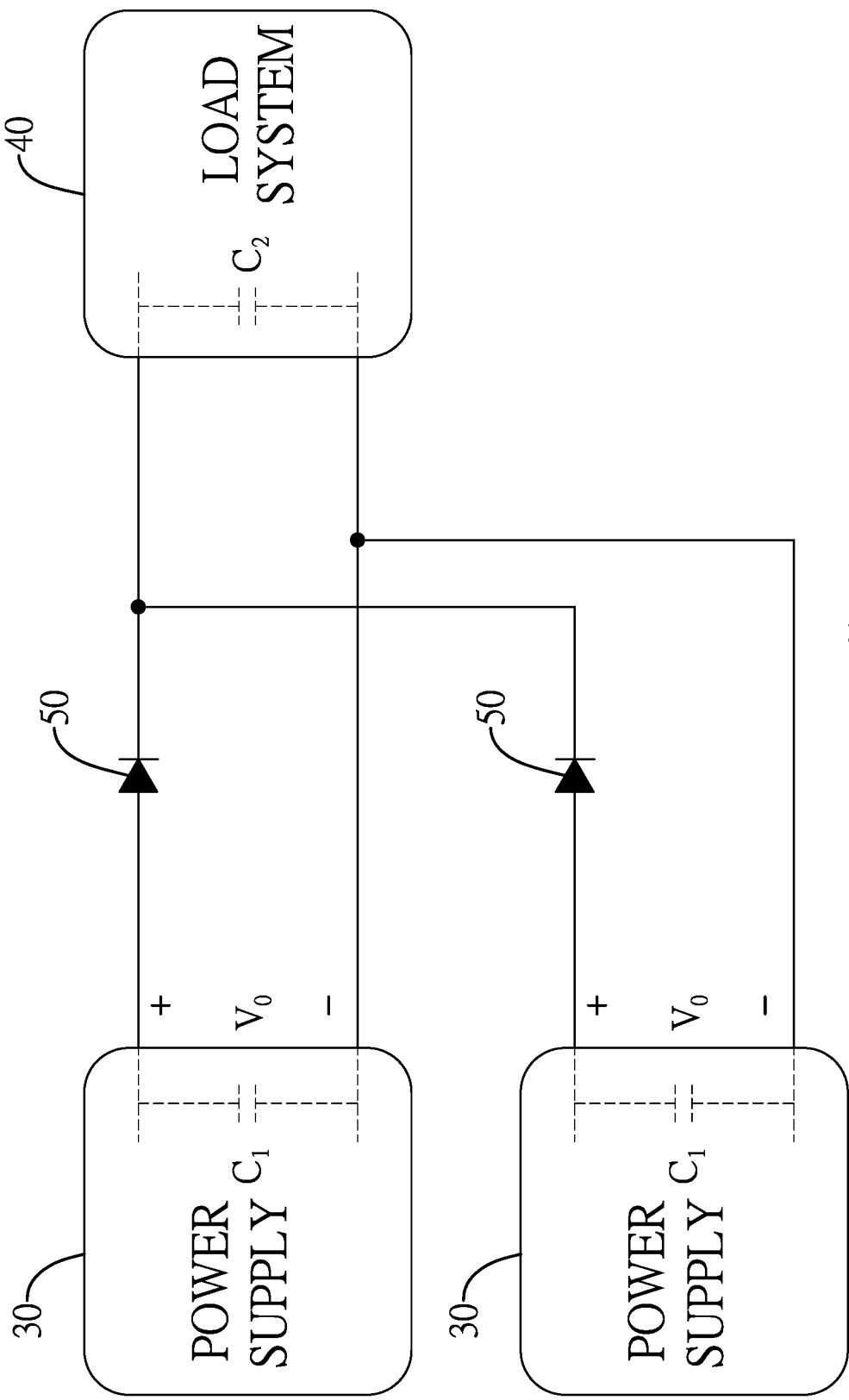
FIG. 7 is a block diagram of the circuit of a conventional redundant power supply system.

Each of the holdup control circuits can further include a bypass switch 14, as shown in FIG. 6. The invention, however, is not limited to the particular example given in FIG. 6. The bypass switch 14 connects between the power terminal 111 of the power supply 11 and the input capacitor $C_{SYS}$ of the load system L, so that the bypass switch 14 becomes parallel to the serially connected OR-gate anti-reverse current element 12 and the inductor 131. The controller (not shown) connects to one control terminal of the bypass switch 14. As an example, the bypass switch 14 can be a transistor having a first terminal, a second terminal, and a control terminal. The first terminal and the second terminal of the transistor can respectively be the drain and source, and the control terminal can be the gate.

When detecting that the power supply 11 outputs the DC power $V_{DC}$, the controller makes the bypass switch 14 conductive and keeps the electronic switch 132 open, so that the DC power output from the power supply 11 flows through the bypass switch 14 and directly reaches the load system L. Since the DC power does not pass the OR-gate anti-reverse current element 12 and the inductor 131, there is no power loss. On the other hand, when detecting no output power from the power supply 11, the controller controls the bypass switch 14 to be open and makes the electronic switch 132 intermittently conductive, thereby implementing the buck converter and prolonging the holdup time.

In summary, the invention is based upon the circuit structure of a typical redundant power supply system. With reference to FIGS. 2 to 6, each of the power supplies 11 is connected with a holdup control circuit 13 to provide the function of prolonging the holdup time. The holdup control circuit 13 comprises only such electronic elements as controller, inductor, diode or transistor. In comparison with large-capacitance capacitors, the cost of the holdup control circuit 13 is lower. Moreover, the size is smaller so that there is no difficulty in the design of the system. The invention attains a good balance between production cost and achieved effects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A redundant power supply system that prolongs holdup time for connection to an input capacitor of a load system, comprising:
   a plurality of power supplies connected in parallel for connecting to the input capacitor, wherein at least one OR-gate anti-reverse current element is connected between a DC output side of each of the power supplies and the input capacitor, and an output capacitor is provided on the DC output sides of the power supplies; and
   a plurality of holdup control circuits, each of the holdup control circuits correspondingly connected between one of the DC output sides of the power supplies and the load system, each of the holdup control circuits comprising
      at least one inductor connected in series to the at least one OR-gate anti-reverse current element;
      at least one electronic switch connected between the DC output side of each of the power supplies and a node where the inductor and the OR-gate anti-reverse current element are connected; and
      a controller connected to the DC output side of each of the power supplies and a control terminal of the at least one electronic switch, thereby determining whether a DC power output from the DC output side goes below a threshold and controlling the electronic switch to turn on and off to prolong the holdup time, when the DC power outputted from the DC output side goes below the threshold.

2. The redundant power supply system of claim 1, wherein the at least one OR-gate anti-reverse current element connected between the DC output side of each of the power supplies and the input capacitor is a single OR-gate anti-reverse current element; and
   only a single inductor and a single electronic switch are in each of the holdup control circuits.

3. The redundant power supply system of claim 2, wherein the DC output side of each of the power supplies has a power terminal and a ground terminal, and the output capacitor is connected between the power terminal and the ground terminal; and
   wherein in each of the holdup control circuits, one terminal of the at least one inductor is connected to the power terminal, the at least one OR-gate anti-reverse current element is connected to the input capacitor, the at least one electronic switch is connected between the ground terminal and the node between the inductor and the at least one OR-gate anti-reverse current element, so that the output capacitor, the OR-gate anti-reverse current element, the inductor, the electronic switch and the controller form a boost converter.

4. The redundant power supply system of claim 3, wherein in each of the power supplies, the at least one OR-gate anti-reverse current element is a diode having an anode and a cathode respectively connected to the inductor and the input capacitor.

5. The redundant power supply system of claim 3, wherein in each of the power supplies, the at least one OR-gate anti-reverse current element is a transistor having a control terminal connected to the controller; and
   a body diode having an anode and a cathode connected respectively to the inductor and the input capacitor.

6. The redundant power supply system of claim 2, wherein the DC output side of each of the power supplies has a power terminal and a ground terminal, and the output capacitor is connected between the power terminal and the ground terminal; and
   wherein in each of the holdup control circuits, one terminal of the at least one inductor is connected to the input capacitor, the at least one OR-gate anti-reverse current element is connected to the power terminal, the at least one electronic switch is connected between the ground terminal and the node between the inductor and the at least one OR-gate anti-reverse current element, so that the output capacitor, the at least one OR-gate anti-reverse current element, the at least one inductor, the at least one electronic switch, and the controller form a buck converter.

7. The redundant power supply system of claim 6, wherein each of the holdup control circuits further includes a bypass switch connected between the power terminal of the corresponding power supply and the input capacitor so that the bypass switch is connected in parallel to the serially connected OR-gate anti-reverse current element and the inductor, and the controller is connected to a control terminal of the bypass switch.

8. The redundant power supply system of claim 6, wherein in each of the holdup control circuits, the OR-gate anti-reverse current element is a diode having an anode and a cathode respectively connected to the inductor and the input capacitor.

9. The redundant power supply system of claim 6, wherein in each of the power supplies, the OR-gate anti-reverse current element is a transistor having:
 a control terminal connected to the controller; and
 a body diode having an anode and a cathode respectively connected to the inductor and the input capacitor.

10. The redundant power supply system of claim 1, wherein the at least one OR-gate anti-reverse current element connected between the DC output side of each of the power supplies and the input capacitor comprises multiple OR-gate anti-reverse current elements; and
 in each of the holdup control circuits, the at least one inductor comprises multiple inductors connected respectively in series to the OR-gate anti-reverse current elements, and the at least one electronic switch comprises multiple electronic switches connected respectively between the nodes between the inductors and the OR-gate anti-reverse current elements and the DC output side of each of the power supplies.

11. The redundant power supply system of claim 10, wherein the DC output side of each of the power supplies has a power terminal and a ground terminal, and the output capacitor is connected between the power terminal and the ground terminal; and
 wherein in each of the holdup control circuits, one terminal of each inductor is connected to the power terminal, each OR-gate anti-reverse current element is connected to the input capacitor, each electronic switch is connected between the ground terminal and the node where the inductor and the OR-gate anti-reverse current element are connected, so that the output capacitor, the OR-gate anti-reverse current element, the inductor, the electronic switch and the controller form a boost converter.

12. The redundant power supply system of claim 10, wherein the DC output side of each of the power supplies has a power terminal and a ground terminal, and the output capacitor is connected between the power terminal and the ground terminal; and
 wherein in each of the holdup control circuits, one terminal of each inductor is connected to the input capacitor, each OR-gate anti-reverse current element is connected to the power terminal, each electronic switch is connected between the ground terminal and the node between the inductor and the OR-gate anti-reverse current element, so that the output capacitor, the OR-gate anti-reverse current element, the inductor, the electronic switch, and the controller form a buck converter.

13. The redundant power supply system of claim 12, wherein each of the holdup control circuits further includes a bypass switch connected between the power terminal of the corresponding power supply and the input capacitor so that the bypass switch is connected in parallel to the serially connected OR-gate anti-reverse current element and the inductor, and the controller is connected to a control terminal of the bypass switch.

14. The redundant power supply system of claim 1, wherein the DC output side of each of the power supplies has a power terminal and a ground terminal, and the output capacitor is connected between the power terminal and the ground terminal; and
 wherein in each of the holdup control circuits, one terminal of the at least one inductor is connected to the power terminal, the at least one OR-gate anti-reverse current element is connected to the input capacitor, the at least one electronic switch is connected between the ground terminal and the node between the inductor and the at least one OR-gate anti-reverse current element, so that the output capacitor, the at least one OR-gate anti-reverse current element, the at least one inductor, the at least one electronic switch, and the controller form a boost converter.

15. The redundant power supply system of claim 14, wherein in each of the power supplies, the at least one OR-gate anti-reverse current element is a diode having an anode and a cathode respectively connected to the inductor and the input capacitor.

16. The redundant power supply system of claim 14, wherein in each of the power supplies, the at least one OR-gate anti-reverse current element is a transistor having
 a control terminal connected to the controller; and
 a body diode having an anode and a cathode connected respectively to the inductor and the input capacitor.

17. The redundant power supply system of claim 1, wherein the DC output side of each of the power supplies has a power terminal and a ground terminal, and the output capacitor is connected between the power terminal and the ground terminal; and
 wherein in each of the holdup control circuits, one terminal of the at least one inductor is connected to the input capacitor, the at least one OR-gate anti-reverse current element is connected to the power terminal, the at least one electronic switch is connected between the ground terminal and the node between the at least one inductor and the at least one OR-gate anti-reverse current element, so that the output capacitor, the at least one OR-gate anti-reverse current element, the at least one inductor, the at least one electronic switch, and the controller form a buck converter.

18. The redundant power supply system of claim 17, wherein each of the holdup control circuits further includes a bypass switch connected between the power terminal of the corresponding power supply and the input capacitor so that the bypass switch is connected in parallel to the serially connected OR-gate anti-reverse current element and the inductor, and the controller is connected to a control terminal of the bypass switch.

19. The redundant power supply system of claim 17, wherein in each of the holdup control circuits, the OR-gate anti-reverse current element is a diode having an anode and a cathode respectively connected to the inductor and the input capacitor.

20. The redundant power supply system of claim 17, wherein in each of the power supplies, the OR-gate anti-reverse current element is a transistor having:
 a control terminal connected to the controller; and
 a body diode having an anode and a cathode respectively connected to the inductor and the input capacitor.

* * * * *